United States Patent
Wu et al.

(10) Patent No.: US 7,031,235 B2
(45) Date of Patent: Apr. 18, 2006

(54) METHOD FOR ADJUSTING A SPEED-DETECTION DEVICE FOR AN OBJECT LENS IN AN OPTICAL PICKUP HEAD

(75) Inventors: Chih-Chung Wu, Tainan (TW); Kuo-Ding Shin, Hsinchu (TW); Chao-Lin Su, Tainan (TW); Kai-Wen Cheng, Ilan (TW)

(73) Assignee: Industrial Technology Research Institute, Hsinchu (TW)

( * ) Notice: Subject to any disclaimer, the term of this patent is extended or adjusted under 35 U.S.C. 154(b) by 739 days.

(21) Appl. No.: 10/167,165

(22) Filed: Jun. 14, 2002

(65) Prior Publication Data
US 2003/0123359 A1 Jul. 3, 2003

(30) Foreign Application Priority Data
Dec. 31, 2001 (TW) .............................. 90133433 A

(51) Int. Cl.
*G11B 7/00* (2006.01)
(52) U.S. Cl. ................................. 369/44.29; 369/44.36
(58) Field of Classification Search ............. 369/44.27, 369/44.28, 44.29, 44.35, 44.25, 30.15, 30.17, 369/53.25, 53.28
See application file for complete search history.

(56) References Cited

U.S. PATENT DOCUMENTS

| | | | |
|---|---|---|---|
| 5,077,716 A * | 12/1991 | Takeda et al. ............ | 369/30.14 |
| 5,317,550 A * | 5/1994 | Semba ....................... | 369/30.2 |
| 5,351,222 A * | 9/1994 | Ikeda et al. .............. | 369/30.17 |
| 5,487,055 A * | 1/1996 | Suzuki ..................... | 369/44.28 |
| 5,623,464 A * | 4/1997 | Tani ........................ | 369/44.28 |
| 5,768,229 A * | 6/1998 | Ikeda ....................... | 369/44.28 |
| 6,157,599 A * | 12/2000 | Yamashita et al. ........ | 369/44.28 |
| 6,327,229 B1 * | 12/2001 | Kawabe ..................... | 369/30.17 |
| 6,661,751 B1 * | 12/2003 | Asakura .................... | 369/44.27 |
| 6,873,577 B1 * | 3/2005 | Mahr ....................... | 369/30.17 |

* cited by examiner

*Primary Examiner*—Thang V. Tran
(74) *Attorney, Agent, or Firm*—Birch Stewart Kolasch & Birch LLP

(57) ABSTRACT

The invention provides a method for adjusting a speed-detection device for an object lens in an optical pickup head. The invention provides an adjusted optical disc drive, wherein the optical pickup head is accelerated/decelerated and the speed-detection device outputs a standard signal level. Next, the optical pickup head of an unadjusted optical disc drive is accelerated/decelerated under the same condition, and the speed-detection device outputs a speed signal level. Finally, the gain of a programmable gain amplifier is adjusted until the speed signal is equal to the standard signal.

6 Claims, 3 Drawing Sheets

METHOD FOR ADJUSTING A SPEED-DETECTION DEVICE FOR AN OBJECT LENS IN AN OPTICAL PICKUP HEAD

BACKGROUND OF THE INVENTION

1. Field of the Invention

The invention relates to a method for adjusting a speed-detection device for an object lens in an optical pickup head, and more particularly for adjusting the speed-detection device of the object lens under conditions of accelerating or decelerating optical pickup heads.

2. Description of the Related Art

In an optical disc drive, the object lens is positioned in the optical pickup head by an elastic means, such as a four-wire actuator. As the rotation speed of the optical disc drive becomes higher, and the requirement of seek-time becomes shorter, the object lens on the optical pickup head vibrates and shifts easily while tracking on the track. Therefore, the object lens and the optical pickup head experience relative motion by the shifting and vibrating phenomena. The optical pickup head is further equipped with a position-detector for detecting the location of the object lens relative to the optical pickup head, and a feedback circuit transforms the location of the object lens into a speed signal for the object lens so as to control the motion.

However, each optical disc drive does not have the same characteristics of mechanism, position-detector and feedback circuit, and the speed-control loop for controlling the position of the object lens in different optical disc drives output different gains. The position-detector, feedback circuit, and a programmable gain amplifier constitute a speed-detection device. Before the optical disc drives reach market, the speed-detection device must be adjusted. A conventional method for adjusting the speed-detection device uses a testing disc with predetermined eccentric value. When the optical disc drive tracks on the tracks on the testing disc, the object lens in the optical pickup head moves in a simple harmonic motion. If the eccentric value of the testing disc is A and the angular velocity of the testing disc is ω, the maximum speed of the object lens is $V_{max} = \omega \times A$ according to the simple harmonic motion. While each unadjusted optical disc drive conventionally uses the same testing disc, the object lens has the same maximum speed. Therefore, the conventional method adjusts the programmable gain amplifier in the speed-detection device, so that the maximum value of the speed signal of the object lens output from each speed-control device are the same.

However, the conventional method has to consider the relative positions of the eccentric axis and the spindle axis. We have to do the adjustment at several different positions and take the average value to get an accuracy result. The conventional method takes too much time to accomplish.

SUMMARY OF THE INVENTION

To solve the above problems, it is an object of the present invention to provide a method for adjusting a speed-detection device for an object lens in an optical pickup head. The method includes the first step of providing an optical disc drive that has been adjusted by an experienced engineer, wherein the optical pickup head of the adjusted optical disc drive is stopped immediately from a constant velocity. The object lens is still kept at the original motion according to Newton's first law, and then the object lens and the elastic means constitute a second-order system. In the adjusted optical disc drive, the speed-detection device outputs a speed signal for the object lens, wherein the speed signal represents the speed of the object lens relative to the optical pickup head in real time. The second step of the invention is to obtain the speed signal level of the maximum speed of object lens as a standard speed signal level. The next step is to stop the optical pickup head of an unadjusted optical disc drive from a constant velocity, wherein the optical pickup head of the unadjusted optical disc drive also moves at the same constant velocity as the optical pickup head of the adjusted optical disc drive before stopping. Next, the speed-detection device measures the speed of the object lens and outputs a speed signal in real time. Finally, the speed signal level representing the maximum speed of the object lens is compared with the standard speed signal level, and then the gain of the speed-detection device is adjusted until the speed signal level representing the maximum speed of the object lens is the same as the standard speed signal level.

Another object of the invention is to provide a method for adjusting a speed-detection device for an object lens in an optical pickup head, including the first step of providing an adjusted optical disc drive, wherein the optical pickup head of the adjusted optical disc drive is accelerated immediately from a first speed to a second speed. Next, the speed-detection device measures the speed of the object lens in the optical pickup head and outputs the speed signal level of maximum speed of object lens as a standard speed signal level. Next, the optical pickup head of an unadjusted optical disc drive is accelerated from the first speed to the second speed. Next, the speed-detection device measures the speed of the object lens and outputs a speed signal in real time. Finally, the speed signal level representing the maximum speed of the object lens is compared with the standard speed signal level, and then the gain of the speed-detection device is adjusted until the speed signal level representing the maximum speed of the object lens is the same as the standard speed signal level.

According to the object mentioned above, one feature of the invention is that when the optical pickup heads in the unadjusted and adjusted optical disc drives are stopped from a constant velocity, the speeds of the object lenses relative to the optical pickup heads are the same.

Another feature of the invention is that when the optical pickup heads in the unadjusted and adjusted optical disc drives are accelerated from a constant velocity to another constant velocity, the speeds of the object lenses relative to the optical pickup heads are the same.

The invention has an advantage of reducing the adjusting time and improving the precision of object lens speed measurement.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and this are not limitative of the present invention, and in which:

As shown in FIG. 1, an object lens 1 is carried in an optical pickup head 2, whereby an elastic means 3, such as a suspensory spring, connects the object lens 1 with the optical pickup head 2. When the optical pickup head 2 is moving, there is a relative motion between the object lens and the optical pickup head.

As shown in FIG. 1, when the optical pickup head 2 is stopped from a constant velocity $V_o$ immediately, the speed of the optical pickup head 2 is decreased exponentially. The speed of the optical pickup head 2 can be expressed in the form $$V_2(t) = V_o \times e^{-at}.$$

At time t, the displacement of the optical pickup head is expressed in the form $$x_2(t) = V_o(1 - e^{-at})/a.$$

If the damping coefficient between the optical pickup head and the object lens is not considered, the motion equation of the object lens is expressed in the form $m[d^2(x^1)/dt^2]=k(x_2+x_o-x_1)$, wherein the initial condition of the object lens is $x_1(0)=x_o$ and $dx_1(0)/dt=V_o$.

After solving the motion equation of the optical pickup head, the displacement of the object lens is expressed in the form $$x_1(t) = \frac{V_0}{a} + x_0 - \frac{V_0}{a}\frac{1}{g+1}e^{-at} - \frac{g}{g+1}\frac{V_0}{a}\cos\left(\sqrt{\frac{k}{m}}\,t\right) + \frac{g}{g+1}V_0\sqrt{\frac{m}{k}}\sin\left(\sqrt{\frac{k}{m}}\,t\right),$$

wherein $g=a^2m/k$. The speed of the object lens relative to the optical pickup head is expressed in the form $$\frac{d}{dt}(x_1(t) - x_2(t)) = \frac{-g}{g+1}V_0 e^{-at} + \frac{g}{g+1}\frac{V_0}{a}\sqrt{\frac{k}{m}}\sin\left(\sqrt{\frac{k}{m}}\,t\right) + \frac{g}{g+1}V_0\cos\left(\sqrt{\frac{k}{m}}\,t\right),$$

wherein $g=a^2m/k$.

Figure 1:
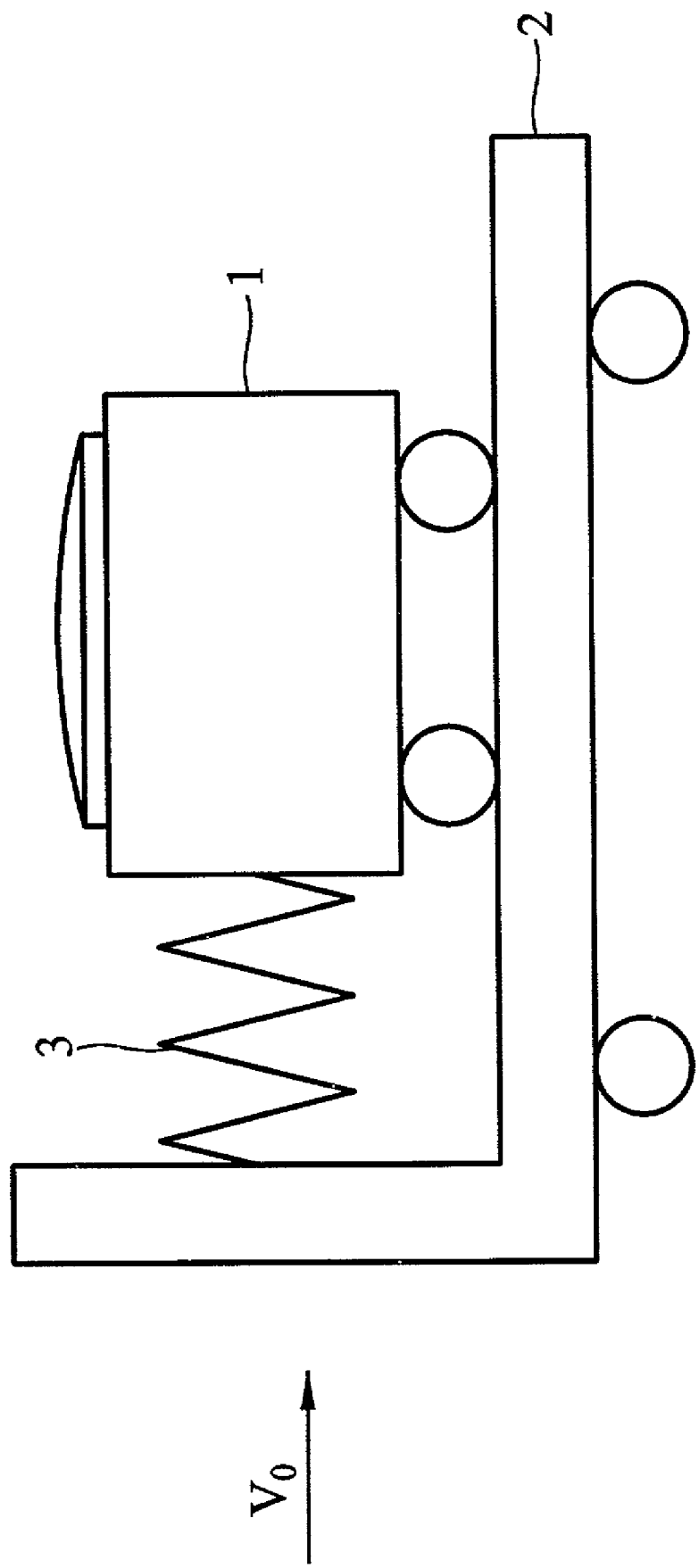
FIG. 1 schematically illustrates the relationship between the object lens and the optical pickup head.
Figure 2:
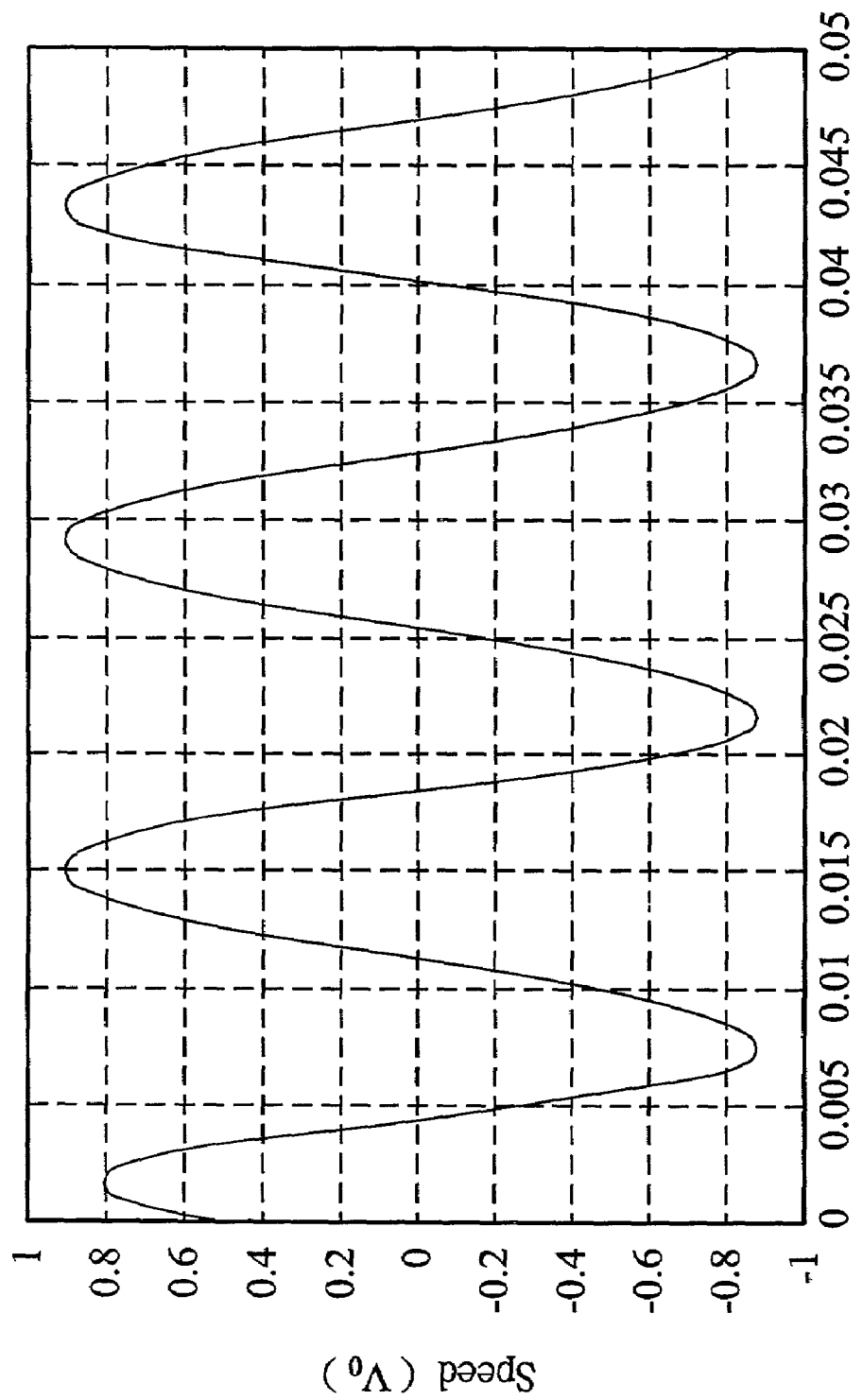
FIG. 2 is a diagram schematically showing the speed of the object lens varying with time.

In the optical disc drive, the natural frequency of the optical pickup head is about 70 Hz, so the term $\sqrt{k/m}$ in the equation is $\sqrt{k/m}\approx 70\times 2\pi\approx 2439.8$ rad/s. The time for stopping the optical pickup head from a constant speed $V_o$ is 0.002 sec. When the speed of the optical pickup head reaches $0.05V_0\approx e^{-3}V_0$, we define that the optical pickup head is stopped. The deceleration of the optical pickup head is $a\approx 3/0.002=1500$. The speed of the object lens varying with time is shown in FIG. 2. As the optical pickup head is stopped as soon as possible, the speed of the object lens relative to the optical pickup head approximates the original speed $V_o$ of the optical pickup head.

According to the foresaid description and FIG. 2, when the optical pickup head is immediately stopped from a speed, the object lens reaches a maximum speed relative to pickup head, which approximates the original speed of the optical pickup head. When the optical pickup head is accelerated from a first constant speed to a second constant speed, the object lens also reaches a maximum speed relative to pickup head, which approximates the difference between the second constant speed and the first constant speed.

Figure 3:
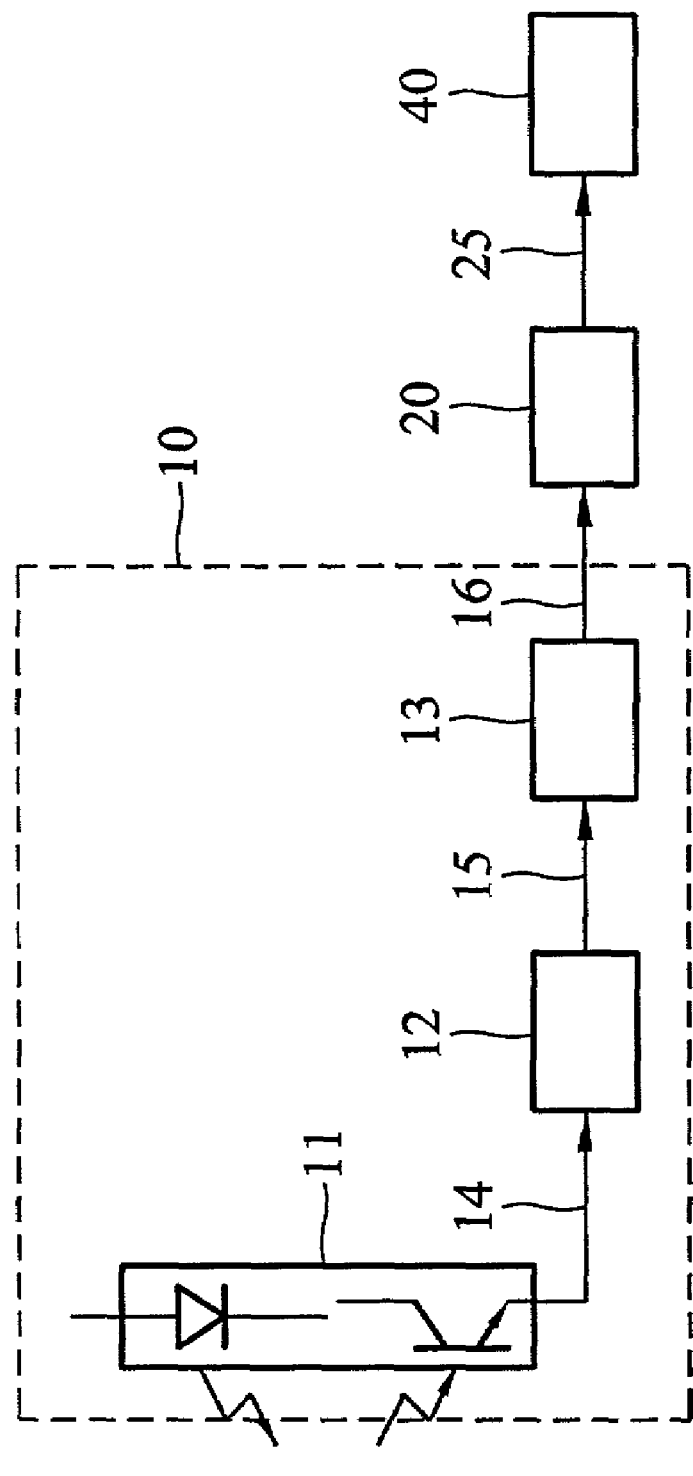
FIG. 3 is a flowchart illustrating how a speed-detection device measures the speed of the object lens.

According to the description mentioned above, the object lens in each unadjusted optical disc drive generates the same speed approximating the original speed $V_o$ of the optical pickup head. FIG. 3 is a flowchart illustrating how a speed-detection device measures the speed of the object lens. As shown in FIG. 3 and according to the foresaid conditions, the position detector 11 of speed-detection device 10 measures the position of the object lens 1 and outputs a position signal 14. The position signal 14 is received by a feedback circuit 12 in the speed-detection device 10. The feedback circuit 12 processes the position signal 14 and obtains the speed of the object lens 1. In the unadjusted optical disc drives, each optical pickup head is stopped from the same speed $V_o$, and makes the object lens to have a maximum speed relative to pickup head approximating the speed $V_o$. Before adjusting the unadjusted optical disc drive, the speed-detection devices 10 output different maximum values for the maximum speed of the object lenses. In FIG. 3, the speed-detection device 10 can be adjusted and the output value changed by utilizing a programmable gain amplifier 13.

Next, an adjusted optical disc drive is provided, and the optical pickup head is also stopped from the same speed $V_o$. Thus, the object lens in the optical pickup head of the adjusted optical disc drive reaches the maximum speed relative to pickup head approximating the speed $V_o$. In the adjusted optical disc drive, the speed-detection device outputs a standard signal level of the maximum speed of the object lens.

Next, in the unadjusted optical disc drive, the speed-detection device 10 is adjusted by the programmable gain amplifier 13 until the signal output level 16 of the maximum speed is equal to the standard signal level from the adjusted optical disc drive. The programmable gain amplifier 13 in the speed-detection device 10 is adjustable by changing the gain of the programmable gain amplifier 13. Thus, the signal output level 16 of the maximum speed from the unadjusted optical disc drive is changed and equal to the standard signal level from the speed-detection device of the adjusted optical disc drive.

The signal output 16 from the speed-detection device 10 is an analog signal and transformed to a digital signal 25 by the A/D converter 20. The digital signal 25 is then delivered to the digital processor 40 in the optical disc drive.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A method for adjusting a speed-detection device for an object lens in an optical pickup head, comprising the steps of:
   providing an adjusted optical disc drive, wherein the optical pickup head of the adjusted optical disc drive is immediately stopped from a constant speed, and the speed-detection device in the adjusted optical disc drive outputs a standard signal level;
   providing an unadjusted optical disc drive;
   stopping the optical pickup head of the unadjusted optical disc drive from the constant speed immediately, and obtaining a speed signal level from the speed-detection device of the unadjusted optical disc drive; and
   adjusting the unadjusted optical disc drive until the speed signal level is equal to the standard signal level.

2. A method for adjusting a speed-detection device for an object lens in an optical pickup head as claimed in claim 1, wherein the speed-detection device comprises:
   a position detector detecting the location of the object lens and outputting a position signal;
   a feedback circuit receiving the position signal and outputting a speed signal; and
   a programmable gain amplifier receiving and amplifying the speed signal.

3. A method for adjusting a speed-detection device for an object lens in an optical pickup head as claimed in claim 2, further comprising the step of adjusting the gain of the programmable gain amplifier until the speed signal level is equal to the standard signal level.

4. A method for adjusting a speed-detection device for an object lens in an optical pickup head, comprising the steps of:
   providing an adjusted optical disc drive, wherein the optical pickup head of the adjusted optical disc drive is immediately accelerated from a first speed to a second speed, and the speed-detection device in the adjusted optical disc drive outputs a standard signal level;
   providing an unadjusted optical disc drive;
   accelerating the optical pickup head of an unadjusted optical disc drive from the first speed to the second speed immediately, and obtaining a speed signal from the speed-detection device of the unadjusted optical disc drive; and
   adjusting the unadjusted optical disc drive until the speed signal level is equal to the standard signal level.

5. A method for adjusting a speed-detection device for an object lens in an optical pickup head as claimed in claim 4, wherein the speed-detection device comprises:
   a position detector detecting the location of the object lens and outputting a position signal;
   a feedback circuit receiving the position signal and outputting a speed signal; and
   a programmable gain amplifier receiving and amplifying the speed signal.

6. A method for adjusting a speed-detection device for an object lens in an optical pickup head as claimed in claim 5, further comprising the step of adjusting the gain of the programmable gain amplifier until the speed signal level is equal to the standard signal level.

* * * * *